United States Patent [19]

Donaldson

[11] Patent Number: 4,518,257

[45] Date of Patent: May 21, 1985

[54] OPTICAL INSPECTION SYSTEM AND METHOD

[75] Inventor: Charles W. Donaldson, Blanchester, Ohio

[73] Assignee: General Electric Company, Cincinnati, Ohio

[21] Appl. No.: 402,681

[22] Filed: Jul. 28, 1982

[51] Int. Cl.[3] .................................................. G01B 11/14
[52] U.S. Cl. ....................................... 356/375; 408/6; 409/218
[58] Field of Search ............... 356/384, 385, 386, 375, 356/399, 400; 250/224; 408/6; 409/218

[56] References Cited

U.S. PATENT DOCUMENTS

| | | | |
|---|---|---|---|
| 1,959,537 | 5/1934 | Kuhne | 356/384 |
| 2,670,651 | 3/1954 | Burns et al. | 356/386 |
| 2,933,973 | 4/1960 | Ask | 356/384 |
| 3,597,093 | 8/1971 | Wolf | 356/165 |
| 3,663,108 | 5/1972 | Yamamuro et al. | 356/386 |
| 3,749,500 | 7/1973 | Carlson et al. | 356/156 |
| 3,795,449 | 3/1974 | McKay | 356/385 |
| 3,900,738 | 8/1975 | McKay | 356/375 |
| 4,021,119 | 5/1977 | Stauffer | 356/159 |
| 4,201,476 | 5/1980 | Musto et al. | 356/386 |
| 4,373,817 | 2/1983 | Coates | 356/384 |
| 4,417,147 | 11/1983 | Faville | 356/376 |
| 4,423,998 | 1/1984 | Inaba et al. | 356/375 |

*Primary Examiner*—R. A. Rosenberger
*Attorney, Agent, or Firm*—Gregory A. Welte; Derek P. Lawrence

[57] ABSTRACT

The invention defines a boundary in space and optically determines the crossing of it by an object and at the time of crossing measures the distance between a point located on the object and the boundary. More particularly, the invention establishes the boundary with respect to an amount of light eclipsed in a light beam positioned in space. In one embodiment, an examination zone containing the boundary is illuminated by two light beams, one of which is produced by inverting and reflecting the other after the other passes through the examination zone with the result that the rate of change in light intensity which occurs during the eclipsing is greater than that in the case of a single beam.

16 Claims, 10 Drawing Figures

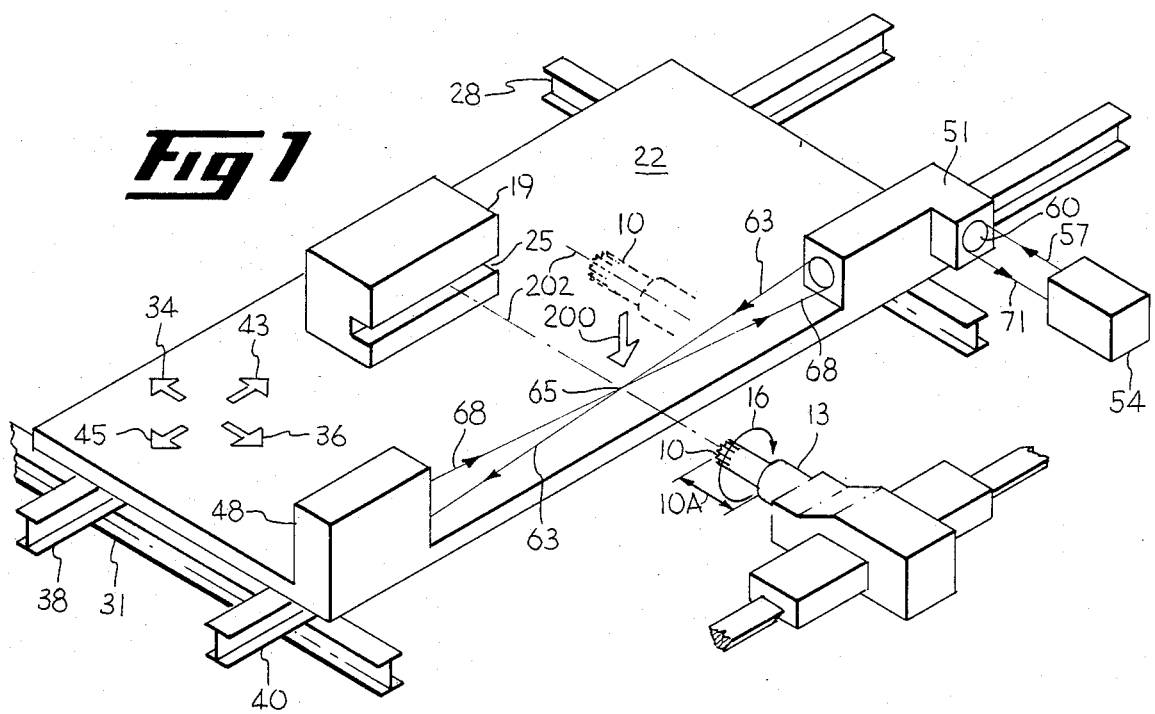
Fig 1
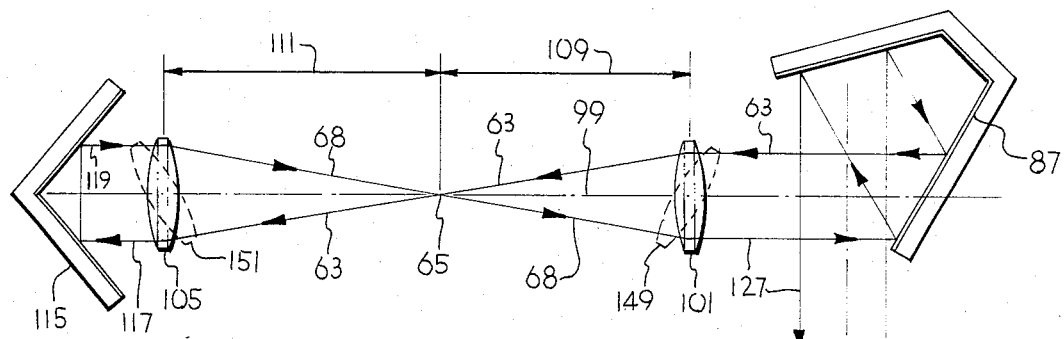
Fig 2
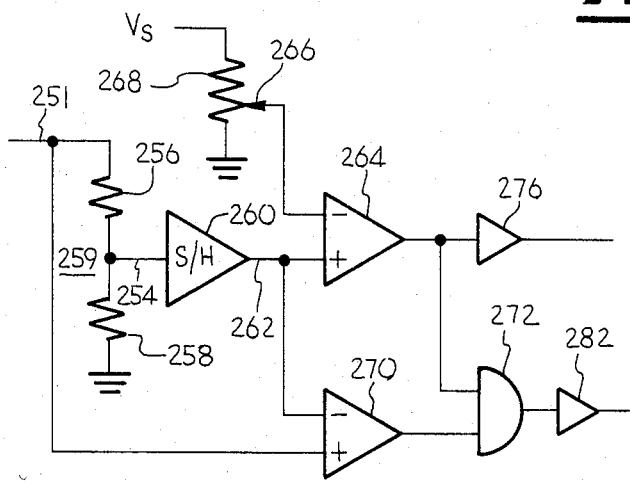
Fig 8
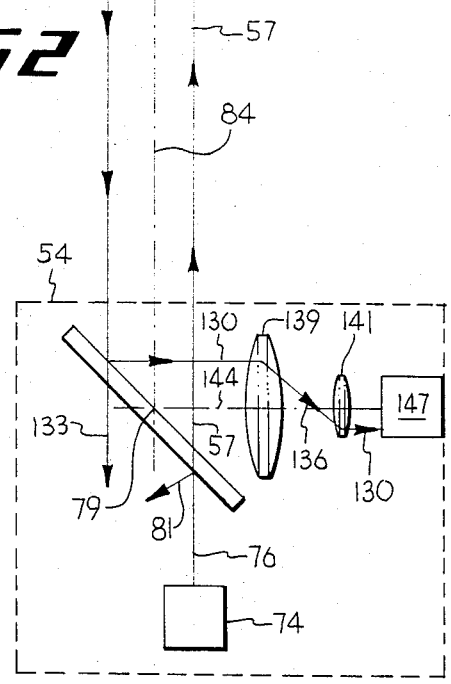

OPTICAL INSPECTION SYSTEM AND METHOD

BRIEF DESCRIPTION OF THE INVENTION

The invention defines a boundary in space and optically determines the crossing of it by an object and at the time of crossing measures the distance between a point located on the object and the boundary.

BACKGROUND OF THE INVENTION

Wasted time, effort, and material occurs in automated milling and cutting factories due to the accidental use of cutting tools and cutting bits of incorrect sizes. Typically, such tools and bits are loaded into compartments in a storage magazine by an operator, each compartment being intended to contain a tool of designated size. A mistake by an operator can cause a tool of the wrong size to be inserted into one of the compartments. When the tools are withdrawn from the magazine by robotic mechanisms for loading into the chuck of a milling machine, the error in tool size may not be detected. Further, even if no error exists in the sizes of the tools, events following their removal can cause tool size variations to occur. Such events include natural wear and tear as well as accidental chipping and breaking. If these variations are not detected, the automated milling machinery will cut the pieces upon which it works to the wrong specifications, thus rendering them unusable.

Numerous approaches exist which attempt to detect these variations in tool size. One approach utilizes mechanical fingers which bracket a tool to be measured and thereby perform a caliper-like mensuration operation. Mechanical fingers suffer the disadvantage that they themselves are subject to wear and tear, and thus are subject to the problem of their own dimensional changes. Further, mechanical fingers, in order to work properly, must contact the tool to be measured, and consequently, they will apply forces to the tool which may move the tool to an undesired position. Further still, mechanical feeler gauges can include delicate precision mechanisms which are subject to the malfunctions common to all mechanical devices.

Another approach is to use a light source to illuminate the tool in question to thereby cast a shadow upon photosensitive elements which measure the size of the shadow and thus obtain an indication of the size of the tool. One problem which can occur in this approach is that refraction occurs at the edges of the tool and thus light rays traveling past the tool from these regions tend to diverge and thus cast a blurred image at the shadow's edge. The greater the distance of the shadow from the tool, the greater is this effect. To minimize this effect by reducing this distance poses the problem of positioning the photosensitive elements near the cutting region of the tool, which is a region subject to vibration, noise, and flying debris.

OBJECTS OF THE INVENTION

It is an object of the present invention to provide a new and improved optical measuring system and method.

It is a further object of the present invention to provide a new and improved optical measurement system which measures a distance from a boundary defined in space to a point located on an object when the object crosses the boundary.

It is a further object of the present invention to provide a new and improved optical measurement system which generates an illuminated examination zone by double exposure of the zone to a beam of light.

It is a further object of the present invention to provide a new and improved optical measurement system which defines a boundary in space and whch generates a signal which indicates that an object is crossing the boundary and which signal has a rate of change which is greater than the rate of change of position of the object.

It is a further object of the present invention to provide a new and improved optical measurement system which is tolerant to hostilities of environment, such as vibration and debris, and which is tolerant of misalignment of its components.

BRIEF DESCRIPTION OF THE DRAWINGS

FIG. 1 illustrates one form of the present invention in conjunction with a cutting tool, workpiece and a movable workpiece support.

FIG. 2 illustrates optical components of the present invention.

FIG. 8 illustrates electronic circuitry of the present invention.

SUMMARY OF THE INVENTION

Figure 3:
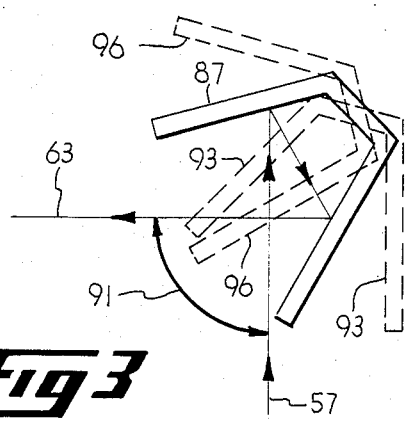
FIGS. 3 and 4 illustrate ranges of rotational misalignment tolerated by two of the optical components of FIG. 2.

The invention projects a beam of electromagnetic radiation and treats a first point contained therein as being crossed by an object when the radiation received by a detector falls below a limit. At this limit crossing, the invention measures the distance from the first point to a predetermined point on the object.

DETAILED DESCRIPTION OF THE INVENTION

FIG. 1 schematically illustrates a cutting tool 10 having a length 10A and held in a chuck or support 13 and whose cutting action may be obtained by rotation of the chuck 13 in a direction such as that shown by arrow 16. Cutting action may be obtained by methods other than rotation: vibration may suffice. A workpiece 19 supported by a table 22 can be moved with respect to cutting tool 10 in order to cut a pattern such as a groove 25 into the workpiece 19. The table 22 is supported by a transparent means such as rails 28 and 31 which allow it to slide in the directions indicated by arrows 34 and 36. The rails 28 and 31 are in turn supported by a transparent means such as rails 38 and 40 which allow table 22 as well as rails 28 and 31 to slide in the directions shown by arrows 43 and 45. It is to be noted that mention of rails is done in a purely symbolic manner and that any of numerous available means can be used to move workpiece 19 with respect to cutting tool 10.

The invention shown in FIG. 1 will now be described. Housings 48 and 51 are affixed to table 22 and housing 54 is affixed to an external support (not shown). These housings contain optical equipment related to the present invention. Housing 54 contains a projector which projects a light beam 57 to housing 51. When housing 51 is properly positioned by motion of table 22 along directions indicated by arrows 43 and 45 so that an aperture 60 receives light beam 57, the optics inside this housing 54 project the received light beam 57 in the direction indicated by a light beam 63. The latter light beam 63 crosses an examination zone indicated as 65 and continues to housing 48 which contains optics which invert and reflect the light beam 63 as a light beam 68 which again crosses the examination zone 65 and is received by the optics in housing 51 and reprojected as a light beam 71 to housing 54. Housing 54 contains a detector which receives the reprojected light beam 71 and generates a signal indicative of its intensity. The operation of these optical elements is more fully described as follows.

FIG. 2 illustrates a source of substantially nondiverging light, such as a laser 74, which projects a light beam 76 to beamsplitter 79. Beamsplitter 79 reflects a part of the light beam 76 such as that shown as a light beam 81, and transmits a part 57 which travels along a first axis 84 to an error compensating 90° reflection means 87, commonly called a pentangular prism reflector. As shown schematically in FIG. 3, the pentangular prism 87 reflects incoming light rays perpendicularly, that is, it bends them by 90 degrees. In particular, incoming light beam 57, corresponding to the light beam 57 received from beamsplitter 79 in FIG. 2, enters the pentangular prism 87 and exits as light beam 63 traveling in a direction perpendicular to the incoming direction. That is, angle 91 is 90 degrees. This pentangular prism 87 is error-compensating in that the exiting beam 63 is always perpendicular to the incoming beam 57 despite rotations of this pentangular prism 87, provided the rotations are within specified limits. For example, the pentangular prism 87 can be rotated between positions indicated by the phantom outlines 93 and 96, provided these phantom outlines represent rotation that lies within the specified limits. As an example, typical practical rotational limits imposed are plus or minus 20°, but theoretical limits of plus or minus 45° are postulated.

As FIG. 2 shows, light exiting the pentangular prism 87 is reflected as beam 63 along a second axis 99, whch is perpendicular to the first axis 84, to a first lens means 101. The light beam 63 incoming to the first lens means 101 is traveling parallel to the second axis 99 and first lens means 101 steers and focuses this light beam 63 to the examination zone 65. The light beam 63 passes through the examination zone 65 to a second lens means 105 which recollimates and steers the light beam 63 so that as it exits the second lens means 105, that is, in a region indicated 107, it is traveling again parallel to the second axis 99. Two requirements are preferably fulfilled in this connection. One, first lens means 101 and the second lens means 105 are preferably equidistant from a focal point (such as 107A in FIG. 7) contained within the examination zone 65. Thus, the distances indicated as 109 and 111 in FIG. 2 are preferably equal. Two, first and second lens means 101 and 105 preferably have the same focal length and this focal length equals distances 109 and 111. One of the purposes of these requirements is to tolerate positioning error of the first and second lens means 101 and 105.

Figure 4:
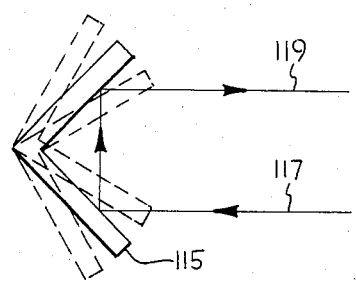
Figure 5:
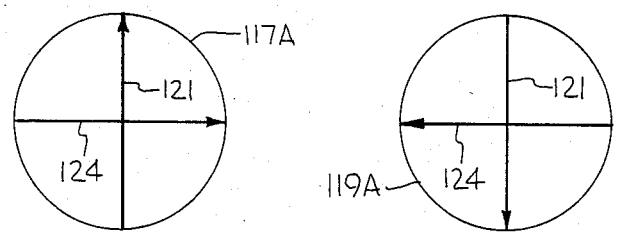
FIGS. 5 and 6 illustrate respectively the cross sections of an univerted and an inverted light beam.
Figure 6:

The light beam 117 exiting the second lens means 105 is received by an error compensating 180° reflector means 115, also called a corner cube. The function of the 180° reflector means 115 can be illustrated by reference to FIG. 4. An incoming light beam 117 entering the corner cube 115 is reflected by this reflection means 115 to become an outgoing light beam 119 which is traveling in a direction parallel, but opposite to, the incoming direction. That is, the direction of the light beam 117 is altered by 180 degrees. Further, the incoming light beam 117 is rotated 180° about its direction, or axis, of propagation by the corner cube 115. That is, as shown in FIG. 5, if the cross section 117A of light beam 117 of FIG. 2 contains two arrows such as 121 and 124 when entering the corner cube 115, upon exiting the corner tube, the cross-sectional image will have been inverted, that is, rotated 180 degrees. Thus, as shown in FIG. 6, the cross section 119A of reflected beam 119 contains the rotated arrows 121 and 124.

In FIG. 2, the now reflected and inverted light beam 119 in region 107 again enters the second lens means 105 but from the opposite side as when it first entered. The second lens means 105 steers and focuses the inverted light beam 119 to the examination zone 65 so that a second, but inverted, light beam 68 passes through the examination zone 65. After passing through the examination zone 65, the inverted light beam 68 enters the first lens means 101 opposite to the side on which it first entered and is recollimated by the first lens means 101 so that it exits this lens means as a beam 127 traveling in a direction parallel to the second axis 99 and thus parallel to the direction in which it entered first lens means 101.

After exiting the first lens means 101, the inverted light beam 127 enters the pentangular prism 87 and is reflected by it so that it exits the pentangular prism 87 perpendicular to the direction in which it most recently entered. That is, light beam 127 now travels parallel to the first axis 84. The inverted light beam 127 travels to the beamsplitter 79 and part of it is reflected as light beam 130 and part of it is transmitted and lost by beamsplitter 79 as a light beam, such as 133. Light beam 130 is steered and focused to a focal region 136 by a lens 139. Light beam 130 travels through this focal region to a lens 141 which has a smaller focal length than lens 139 in order to match the aperture of the system to that of the photodetector 147. Light beam 130 exits lens 141 traveling parallel to a third axis 144 and travels along the axis to a photodetector 147. Of course, photodetector 147 and lenses 139 and 141 may be located on the side of beamsplitter 79 to which beam 133 is transmitted and may receive that beam. Photodetector 147 contains photosensitive elements and it generates a signal indicative of the intensity of the light beam 130 received.

Two things should be noted at this point. One, light beam 57 enters a receiving means which comprises four components; namely, pentangular prism 87, first lens 101, second lens 105, and corner cube 115, and then exits this receiving means as light beam 127. The respective incoming and exiting light beams 57 and 127 to the receiving means do not both follow the same path in the description given above. However, the relative positions of the four components comprising the receiving means are preferably adjusted so that the incoming and exiting beams 57 and 127, respectively, will in fact follow the same path. That is, the incoming beam 57 will be one which travels exactly on the first axis 84, be reflected by pentangular prism 87 and then travel exactly on the second axis 99. Its direction will be reversed by the corner cube 115, and then it will return exactly on the second and then exactly on the first axis. This is termed the ideal case and, in practice, the ideal case is approached as closely as possible by adjustment of the four components.

Two, as mentioned above, pentangular prism 87 and corner cube 115 reflect light along paths which are bent 90° and 180° respectively to the incoming light paths despite rotational errors. That is, these components can occupy positions shown by the phantom outlines in FIGS. 3 and 4 and nevertheless function properly. Further, since first and second lens means 101 and 105 have identical focal lengths, they too can be rotationally misaligned to occupy the phantom outlines 149 and 151 shown in FIG. 2. This tolerance to rotational misalignment is important in view of the environment to which the invention is to be subjected, such as the environment shown in FIG. 1.

In this environment, pentangular prism 87 and first lens means 101 are preferably contained in housing 51 while second lens means 105 and corner cube 115 are preferably contained in housing 48. Beamsplitter 79, lenses 139 and 141, and detector means 147 are preferably contained in housing 54. In this environment, housings 48 and 51 are subject to vibrational instabilities which tend to rotate the components into misaligned positions such as those indicated by the phantom outlines in FIGS. 2, 3, and 4. Further, errors occurring at the time of installation can result in similar misalignments. Further still, dimensional changes due to changes in temperature can cause similar alignment errors. Still further, the laser beam 57 can shift left and right in FIG. 2 due to its possibly inherent instability. In view of this, the particular arrangement of the optical components described above allows precise degree of control of the position of the intersection of the laser light beams 63 and 68 even when the components are positioned incorrectly.

Figure 7:
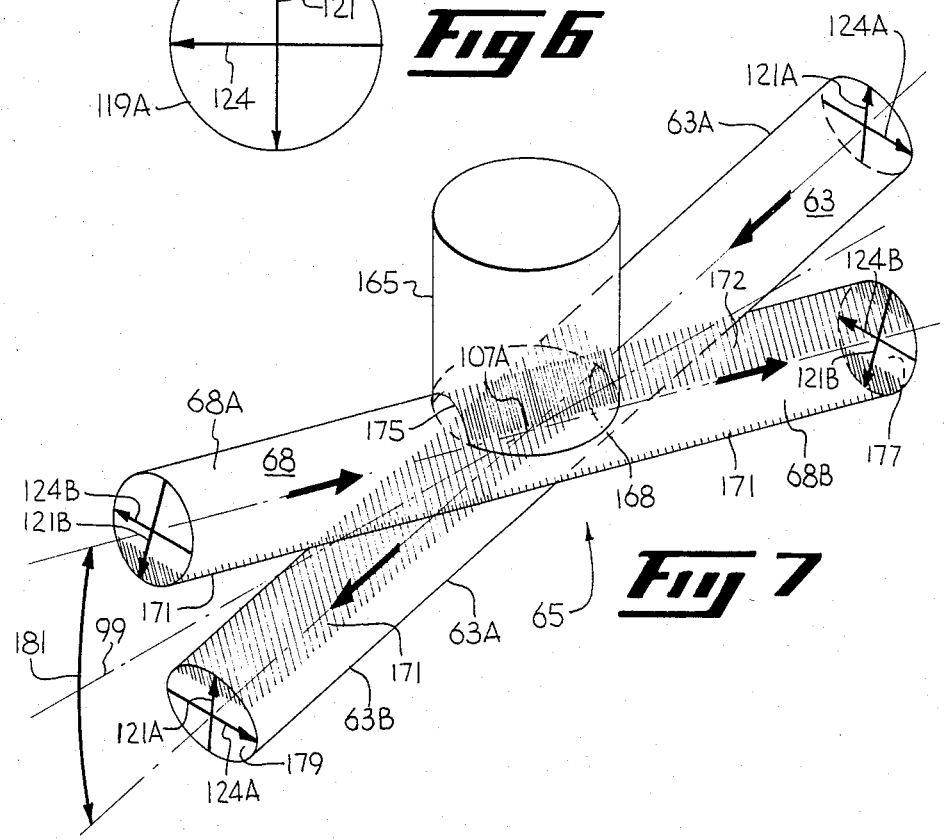
FIG. 7 illustrates an object entering the examination zone.

Examination zone 65 is shown in an enlarged view in FIG. 7. Parts of beams 63 and 68 in FIG. 2 are respectively designated 63A, 63B, 68A, and 68B in FIG. 7. Arrows 121A and 124A indicate the uninverted status of beam portions 63A and 63B while arrows 121B and 124B indicate the inverted status of beam portions 68A and 68B since these latter beam portions have been inverted by the corner cube 115 (not shown in FIG. 7).

A sample object 165 (corresponding to tool 10 in FIG. 1) can be moved downward into the examination zone 65 to thereby eclipse light beams 63 and 68. (For simplicity, object 165 is shown moving downward in FIG. 7 and not leftward as tool 10 moves in FIG. 1.) As shown in FIG. 7, some eclipsing occurs at region 168 so that no light is transmitted in the region designated 171. After inversion by the corner cube (not shown in FIG. 7), light beam 68 in FIG. 2 returns to the examination zone 65 as a light beam 68A in FIG. 7, and still, no light travels in the eclipsed region 171. However, a second eclipsing occurs at region 175 so that no light travels in region 172. Thus, beam portion 68B bears two eclipsed regions: one at the top (region 172) and one at the bottom (region 171). In addition, if light beams 63 and 68 are aligned as in the ideal case, the combination of the eclipsing of both regions 171 and 172 will eclipse twice as much light as is eclipsed in region 171 alone. Thus, the sensitivity of the light intensity in uneclipsed region 177 to the position of object 165 is enhanced. Further, the speed at which the light intensity in region 177 is reduced is greater than the speed with which the object itself moves into the examination zone.

The light beams 63 and 68 in FIG. 7 are not shown as being positioned in accordance with the ideal case mentioned above. If they are so positioned, they will not cross each other at the greatly exaggerated angle 181 as shown in FIG. 7, but they will cross each other at a much smaller angle. That is, they will approach being coaxial and, when viewed from the side in FIG. 7, they will approach forming a single cylinder of light composed of two beams 63 and 68. Thus, eclipsing which is tantamount to the eclipsing at both regions 168 and 175 occurs when any single point of object 165 contacts the cylinder of light. That is, in the ideal case, the eclipsing at a single point on the surface of the cylinder of light simultaneously creates two eclipsed regions similar to the eclipsed regions 171 and 172. Thus, points 168 and 175 effectively become coincident in space.

An arrangement of optical components has been described which projects a nondiverging light beam to a precisely located examination zone and which maintains the precision of location despite positioning errors in certain of the components. Whether the light beam is crossing the examination zone 65 in a manner approaching the ideal case can be determined by first projecting beams 63 and 68 into the examination zone 65. Then a visual examination can be done, as by blowing smoke into the examination zone 65 and investigating the coincidence of the light beam 63 and 68 as rendered visible by the smoke. Alternately, light beam 57 can be moved left and right and when the intensity of returning beam 127 reaches a maximum, the ideal case can be considered as implemented. As an example, a laser beam 76 of diameter 32 mils has produced an examination zone 65 of effective diameter of 10 to 18 mils. (The focusing function of lenses 101 and 105 serves to reduce the beams' diameter.)

The utilization of a boundary in the examination zone 65 to measure the length of an object will now be described. Following this description is a description of the generation of the boundary. A reference tool analogous to the tool 10 and of known length 10A is placed in chuck 13 in FIG. 1. The chuck 13 is moved with respect to examination zone 65 until the tool 10 penetrates the examination zone 65 and eclipses a predetermined amount of light. The predetermined amount of light establishes the boundary. That is, the amount of light present in the uneclipsed region 177 in FIG. 7 establishes the location of points 168 and 175. Of course, the boundary (a one-dimensional concept) is defined by the area eclipsed (a two-dimensional concept). It is important to note that the shape of the eclipsing tool can affect the shape of the area eclipsed and it is thus possible to introduce errors by establishing the boundary with a tool of one shape and then crossing it with a tool of a different shape. Position measuring equipment such as numerical control equipment (not shown) records the exact position of the workpiece-supporting table 22 with respect to chuck 13. The boundary occupies a fixed position with respect to the table 22, since the tool 10 occupies a fixed position with respect to the chuck 13, and since the dimensions of all three (the table 22, the reference tool 10 and the chuck 13) are all known in advance. Therefore, the distance from the boundary to any selected point on either the reference tool 10 or the chuck 13 can be computed from the record in the numerical control equipment. Similarly, a sample tool can be fitted in the same fixed position in the chuck 13 and brought to the boundary. Again, the distance from the boundary to the selected point on the tool or chuck 13 can be computed from the numerical control equipment and a comparison of this distance with that found in the case of the reference tool 10 allows computation of the length of the sample tool.

The circuitry which establishes the boundary is the following. Conduit 251 in FIG. 8 is connected to an output of the detector 147 of FIG. 2. Conduit 251 is further connected to a node 154 by means of a resistor 256. Node 254 is connected to ground by means of a resistor 258 and node 254 comprises the input terminal of a sample-and-hold (S/H) circuit 260. Resistors 256 and 258 comprise a voltage divider network 259. The output 262 of S/H 260 is connected to one input (+) of a comparator 264, the other input (−) of which is connected to a tap 266 on a variable resistor 268. Variable resistor 268 is connected between a power source Vs and ground.

The output 262 of S/H 260 is further connected to one input (−) of a comparator 270, the other (+) of which is connected to conduit 251. The output of comparator 264 is connected to one input of an AND gate 272. The output of comparator 264 is further connected to an input of amplifier 276.

The output of comparator 270 is connected to the other input of AND gate 272. The output of AND gate 272 is connected to an input of amplifier 282. The operation of this circuitry is as follows.

Prior to moving the reference tool 10 into the examination zone 65, the intensity of a predetermined fraction of the uneclipsed light beam 130 in FIG. 2 is recorded as a voltage signal by S/H 260. That is, the voltage signal present at conduit 251 is indicative of the intensity of the uneclipsed light reaching detector 147 in this situation. Voltage divider 259 presents a predetermined fraction of this voltage signal to the input of S/H 260. The fraction depends on the value of resistors 256 and 258. This fractional voltage signal is held by S/H 260 and fed to the input (−) of comparator 270.

As the reference tool 10 is brought into the examination zone 65, light is eclipsed. When sufficient light is eclipsed so that the voltage signal at conduit 251 equals the fractional voltage held by S/H 260, comparator 270 is triggered. The output of comparator 270 is fed to AND gate 272, as is the output of comparator 264. The output of comparator 264 indicates whether the light received by detector 147 in FIG. 2 is above a predetermined minimum needed for proper circuit functioning. This minimum is established by tap 266. If it exceeds the minimum, AND gate 272, in response to the output of comparator 270, produces a signal which is fed to amplifier 282 and thence to the numerical control equipment (not shown). At this instant, the numerical control equipment records the table 22-chuck 13 position information. From this information, a dimension of the reference tool can be determined. Viewed another way, this table-chuck position information together with the length (measured in advance) of the reference tool can be used to compute the location of the boundary.

The procedure described in the two paragraphs above is repeated, but with a sample tool replacing the reference tool 10 in FIGS. 1 and 7. Table-chuck position information obtained from the numerical control equipment allows computation of the dimension of the sample tool.

It is to be noted that the predetermined fraction of the voltage present at conduit 251 which is applied to the input of S/H 260 provides a dynamic self-calibration feature. That is, the location of the boundary in the examination zone 65 is not altered by subsequent shifts in the intensity of the laser 74 nor by dirt lodging on the optical components. This is because the boundary is defined by a predetermined fraction of light beam 130 in FIG. 2. Changes in the intensity of laser 74 and lodging of dirt upon the optics do not, in general, change this fraction.

Figure 9:
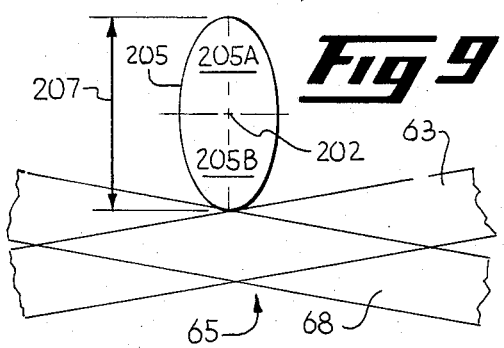
FIGS. 9 and 10 illustrate two different objects entering the examination zone.

The operation described above provides a method for determining the length of a sample tool contained in a holder. The present invention can also be used to determine the diameter or another cross-sectional dimension of a tool as follows. A reference tool 10 is moved so that it lies above the examination zone 65 as shown in phantom outline in FIG. 1 and then lowered in the direction of arrow 200 into the examination zone 65 to establish a boundary. As described above, the numerical control equipment yields data that allows computation of the position of an axis 202 of the tool. Bringing a sample tool to the boundary in the same way and noting the position of its axis 202 at the time of boundary crossing allows a comparison of its diameter with that of the reference tool. Since the diameter of the reference tool is known, that of the sample tool can be found from the comparison. As FIG. 9 shows in cross section, an elliptical tool 250 is located at the boundary. If the tool 205 is rotating, the eccentric portions 205A and 205B will cross the boundary intermittently. Thus, a flickering boundary crossing signal indicates a tool which is out-of-round. The effective cutting diameter of such a tool is that distance 207 and it can be determined as above.

Figure 10:
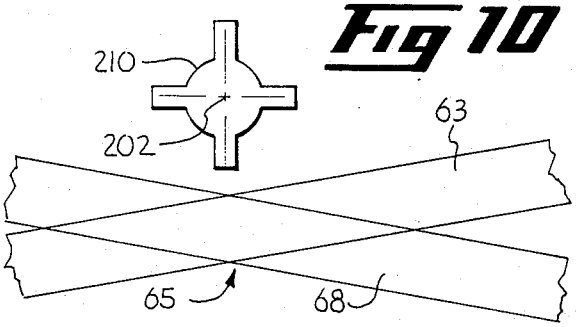

The present invention can also be applied to determine the number of flutes upon, and the diameter of, a fluted tool. As FIG. 10 shows in cross section, a fluted tool 210 is brought to the boundary. The periodic boundary crossings caused by rotation of the tool will cause the issuance of periodic boundary crossing signals. The speed of rotation of the tool is known from the numerical control equipment, so that the length of time of one revolution is also known. Counting the number of boundary crossings in this time interval gives an indication of the number of flutes on the tool.

Further, if one flute is abnormally long, it will behave like eccentric portions 205A and 205B and will produce a periodic boundary crossing signal. If the tool is positioned so that the abnormal flute is the only flute producing a crossing signal, detection of this solitary crossing signal in the time interval of one revolution indicates the abnormality. Bringing the tool axis 202 closer to the boundary until another flute crosses it will allow a computation of the difference in length between the two flutes. Repeating this process until all flutes produce crossing signals in the above time interval allows computation of the distance between the longest and shortest flutes.

The discussion above is concerned with the measurement of rotating tools. The invention is not, however, limited to measuring rotating tools nor tools themselves. The invention provides a means to measure objects generally. The discussion above speaks of the use of numerical control equipment but other types of position-measuring equipment can be used.

Once the tool has been measured, several possible options are available. The measurement can be compared with a desired measurement and if the two measurements are unequal, a signal can be issued to a machine operator reporting the inequality. Alternately, the tool of incorrect measurement can be used in a machining operation which compensates for the size difference of the tool.

One embodiment is disclosed of an invention which optically measures in situ a dimension of a tool. Modifications and substitutions can be made without departing from the spirit and scope of the invention set forth in the following claims.

What is claimed is:

1. Apparatus for measuring a dimension of an object comprising:
   (a) means for projecting a beam of light through an examination zone,
   (b) means for inverting said beam of light and for returning said beam of light through said examination zone,
   (c) detection means for producing a detection signal which indicates the degree of diminution of light passing through said examination zone, the diminution of the light being caused by the object's entering the examination zone,
   (d) object-position means for generating a position signal from which the position of a predetermined point on said object can be derived,
   (e) means coupled both to said object position means and to said detection means for determining the distance between the point on said object and said detection point when the degree of diminution of said light reaches a predetermined level.

2. Apparatus according to claim 1 in which the predetermined level is established by sample-and-hold circuitry.

3. Apparatus for measuring a dimension of an object, comprising:
   (a) a light beam projector for projecting a collimated beam of light along a first axis,
   (b) a movable first reflection means for receiving said light beam and directing said light along a second axis and for receiving light propagating along said second axis and directing the light toward said projector whenever said first reflection means is located at any position in a predetermined range of positions,
   (c) a second reflection means, which is located in a predetermined substantially fixed position with respect to said first reflection means, for receiving light propagating along said second axis and for inverting and reflecting the light in a direction parallel to that of the received light whenever said second reflection means is located at any position in a predetermined range of positions,
   (d) a first lens means located between the two said reflection means for receiving light from said first reflection means and directing it through a detection point and for receiving light from said detection point and directing it parallel to said second axis to said first reflector means,
   (e) second lens means located between the two said reflection means for receiving light passing through said detection point and directing it to said second reflection means and for receiving light from said second reflection means and directing it through said detection point,
   (f) first position detection means for generating a position signal indicating a predetermined detection point in space,
   (g) detection means for producing an eclipsing signal indicating an eclipsing of said light beam at said detection point by said object,
   (h) intelligence means coupled to said first position detector means and to said detector means for indicating, in response to the signals from each, the distance between the point on said object and said detection point.

4. Apparatus for measuring a dimension of an object, comprising:
   (a) projection means for projecting a beam of light through a beamsplitter;
   (b) means for receiving said light beam, and for consecutively doing the following: projecting said light beam to an examination zone, inverting said light beam, projecting the inverted light beam to said examination zone, and returning said light beam to the beamsplitter; and
   (c) detection means for receiving the light beam from the beamsplitter and for generating an intensity signal indicative of the intensity of the received light.

5. Apparatus in accordance with claim 4 and further comprising means for generating a reference signal indicative of a predetermined fraction of the intensity of light received by said detection means when said beam travels unimpeded through said examination zone and
   means for comparing said intensity signal with said reference signal when an object is present in said examination zone and for generating an eclipsing signal when the intensity signal equals the reference signal.

6. Apparatus according to claims 1, 2, 3, 4, or 5 in which the object comprises a cutting tool.

7. Apparatus in accordance with claim 6 in which the means for generating the reference signal comprises a sample-and-hold circuit.

8. Apparatus in accordance with claim 5 and further comprising:
   (a) object position means for generating an object position signal from which the position of a predetermined part of said object can be derived, and
   (b) means coupled to the object position means and to said comparison means for computing a dimension of said object in response to said eclipsing signal.

9. Apparatus in accordance with claim 8 and further comprising means for detecting recurring fluctuations in said intensity signal.

10. Apparatus in accordance with claim 5 and further comprising means for producing a signal indicative of the position of a boundary located in said examination zone,
    (a) means for generating an object position signal from which the position of a predetermined point on the object can be derived
    (b) means for generating a crossing signal indicative of the crossing of said boundary by the object, and
    (c) means coupled to said crossing signal generating means and to said object-position signal generating means for determining the distance between said boundary and said point on said object.

11. Method for measuring a dimension of a tool present in a tool holder, comprising the steps of:
    (a) projecting a light beam to an examination zone,
    (b) inverting said light beam,
    (c) projecting the inverted light beam to said examination zone,
    (d) moving said tool into said examination zone to eclipse said light beams pf (a) and (c),
    (e) determining the depth of penetration of said tool into said examination zone,
    (f) generating a position signal from which the position of said tool can be derived, and
    (g) deriving said dimension of said tool from said position signal and said penetration depth.

12. Method in accordance with claim 11 in which the step of determining the depth of penetration of said tool into said examination zone comprises the steps of:
   measuring uneclipsed light passing through said examination zone,
   moving a reference object into said examination zone until a selected amount of light remains uneclipsed, and
   moving a sample object into said examination zone until said selected amount of light remains uneclipsed.

13. Method in accordance with claim 11 in which the step of determining the depth of penetration of said tool into said examination zone comprises the step of:
   generating a signal from a plurality of photosensors in known positions in response to said eclipsing.

14. A method for ascertaining a dimension of an object in a holder comprising the steps of:
   (a) projecting a beam of substantially nondiverging light through a beamsplitter, then
   (b) reflecting the light beam with an error-compensating 90° reflector, then
   (c) focusing the light beam to an examination zone, then
   (d) collimating the light beam after it passes through the examination zone, then
   (e) reflecting and inverting the light beam with an error-compensating 180° reflector, then
   (f) focusing the inverted light beam to the examination zone, then
   (g) collimating the inverted light beam after it passes through the examination zone, then
   (h) reflecting the light beam to the beamsplitter with the error-compensating 90° reflector, then
   (i) reflecting the light beam by the beamsplitter to a detector which produces a signal indicative of the intensity of the light beam, then
   (j) establishing a reference position for a reference object by defining an amount of light in the examination zone to be eclipsed, then
   (k) moving a sample object supported by the holder into the examination zone until the signal produced by the detector indicates that said amount of light has been eclipsed, and then
   (l) comparing the position of the holder with a holder reference position.

15. A method according to claim 14 in which the step of establishing the reference position comprises eclipsing the light in the examination zone to define the amount of light to be eclipsed.

16. A method according to claim 14 and further comprising the steps of:
   rotating the sample object at a predetermined rate and
   counting the number of times the rotating sample object eclipses the defined amount of light of step (j) in a predetermined time interval.

* * * * *